UNITED STATES PATENT OFFICE.

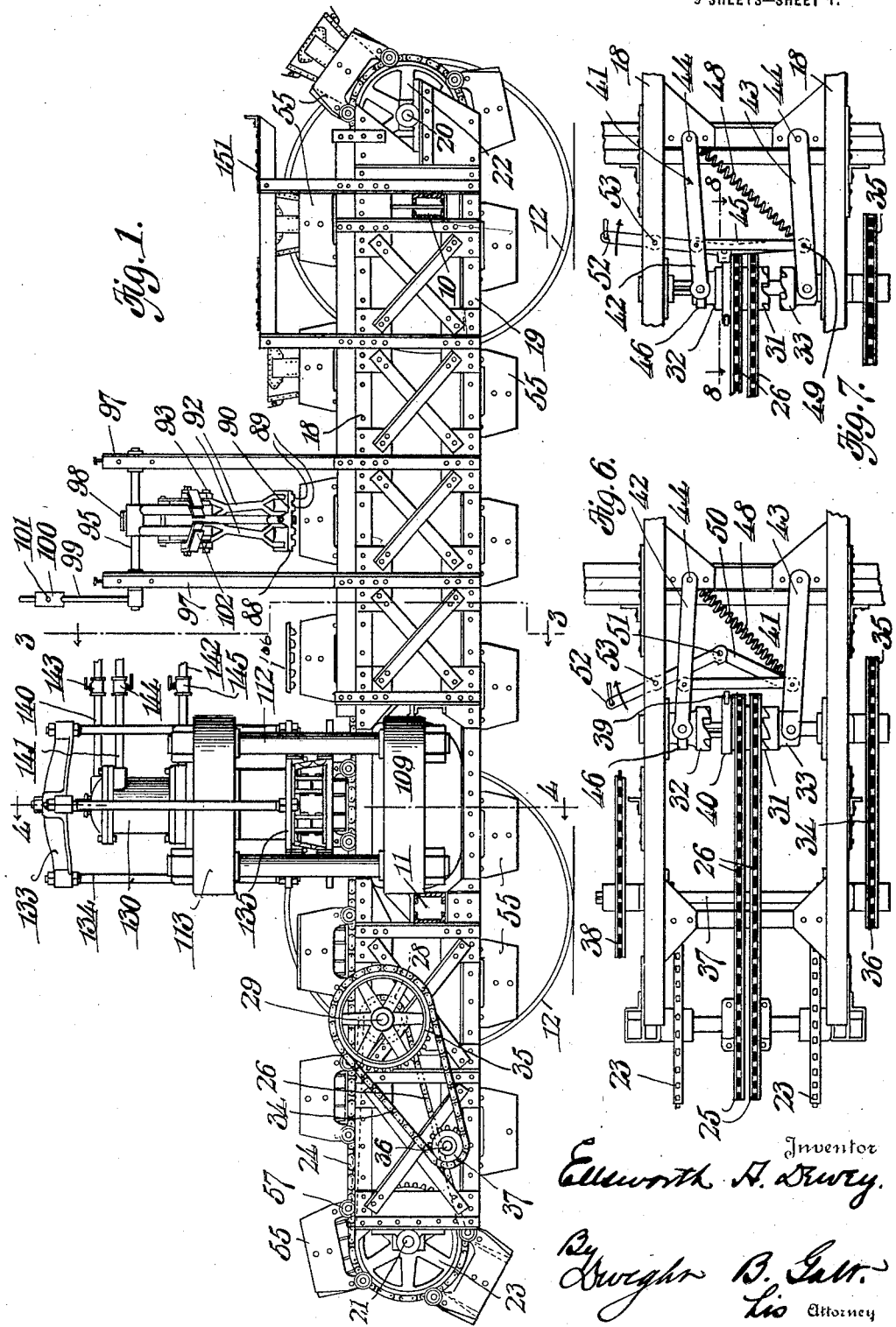

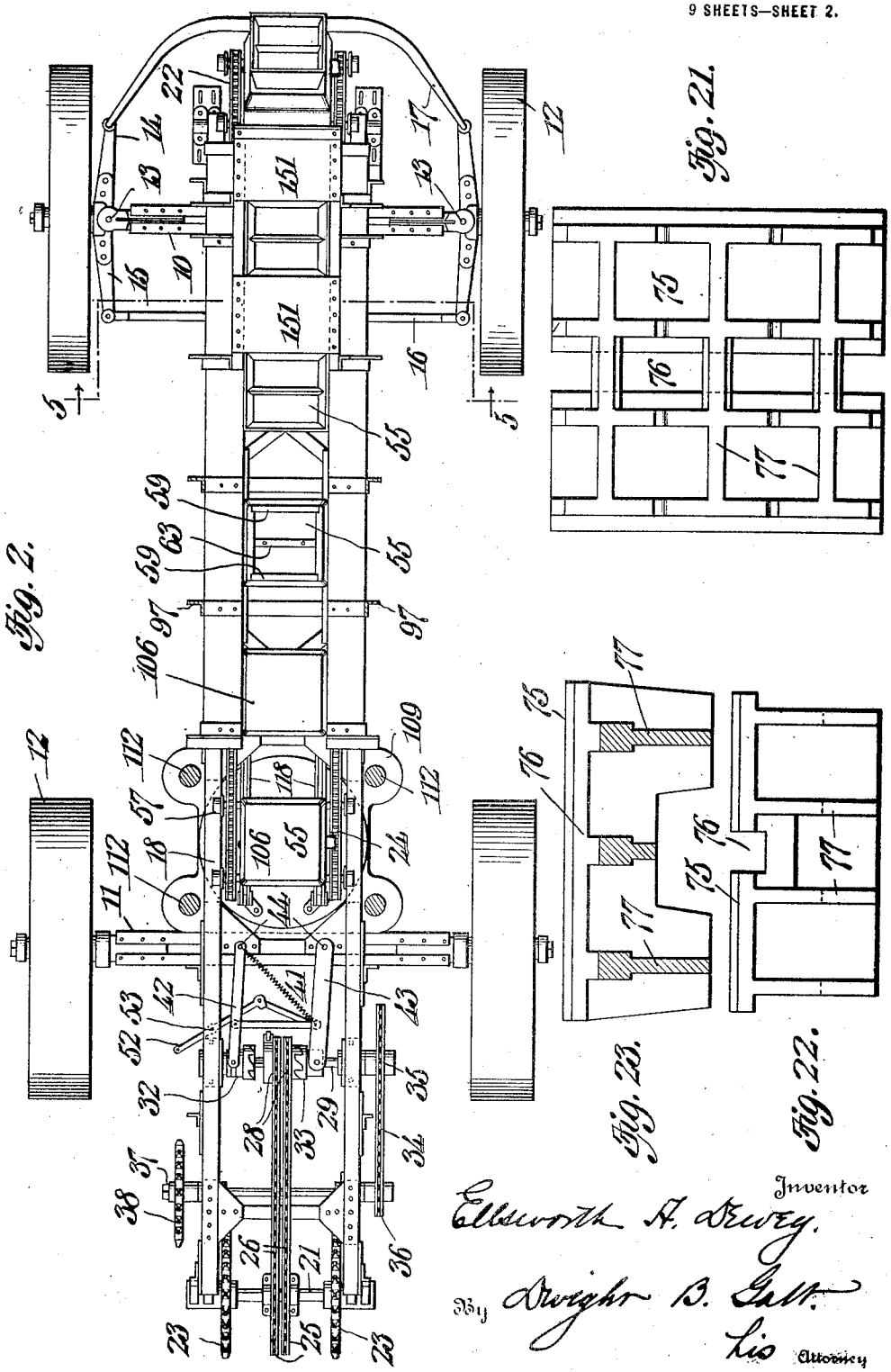

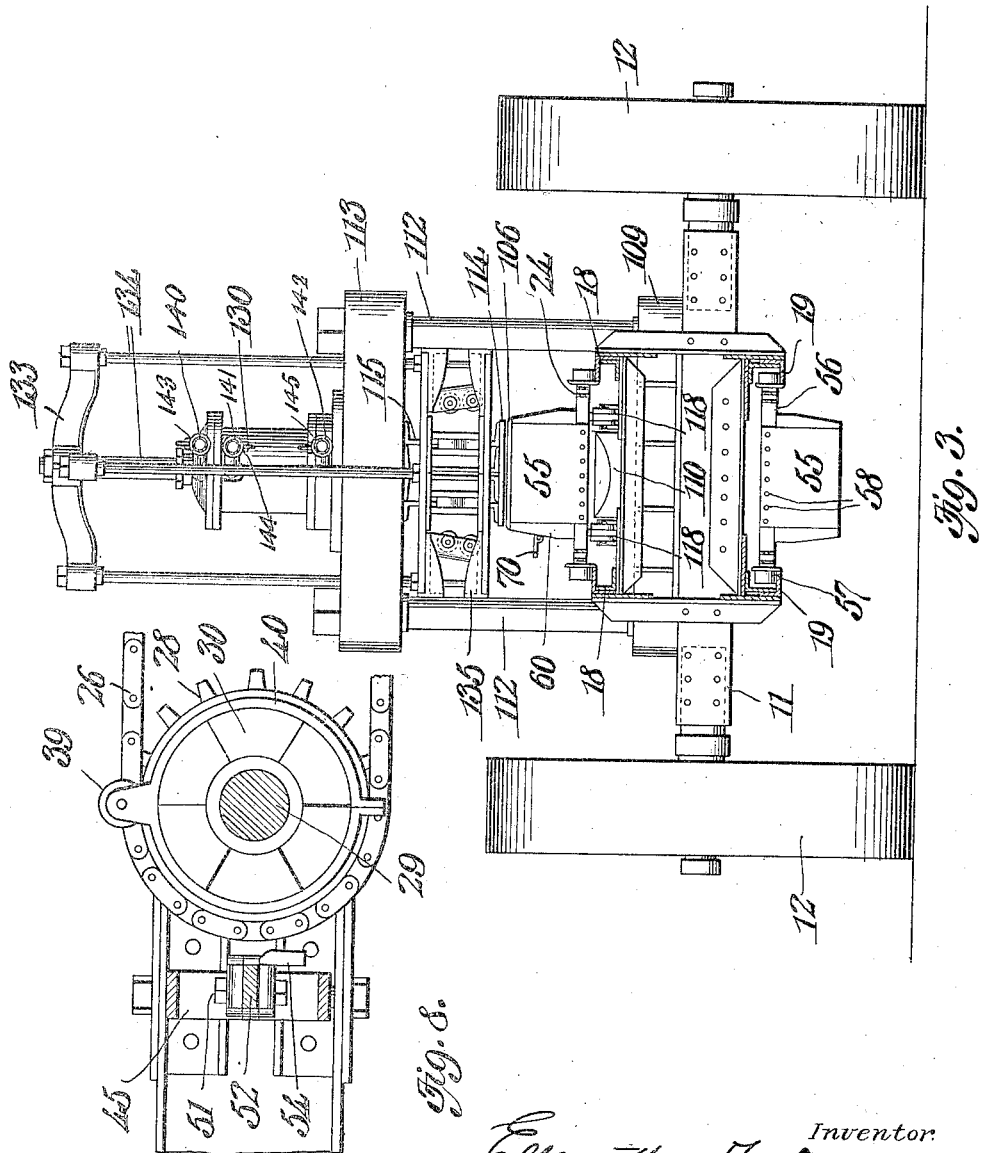

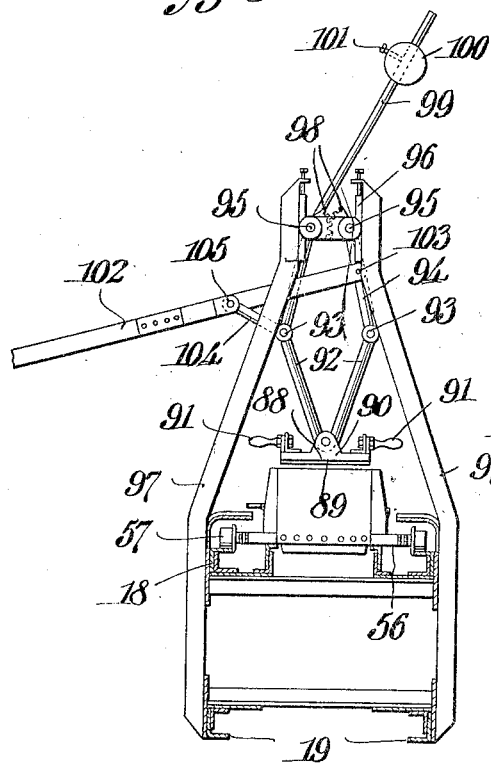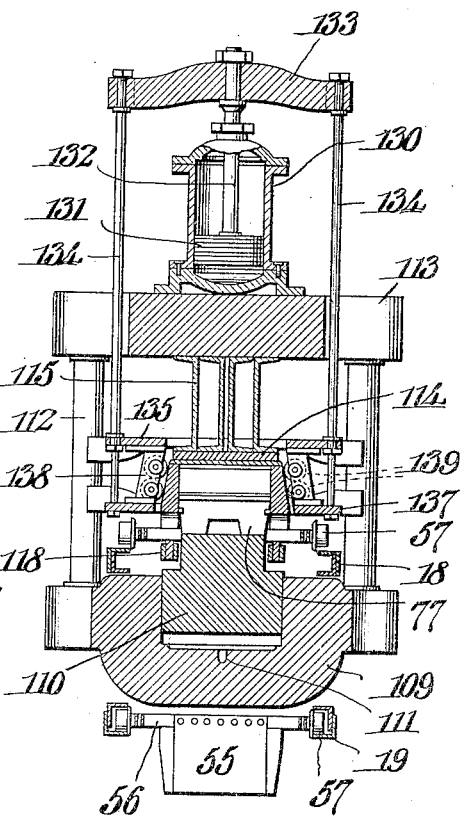

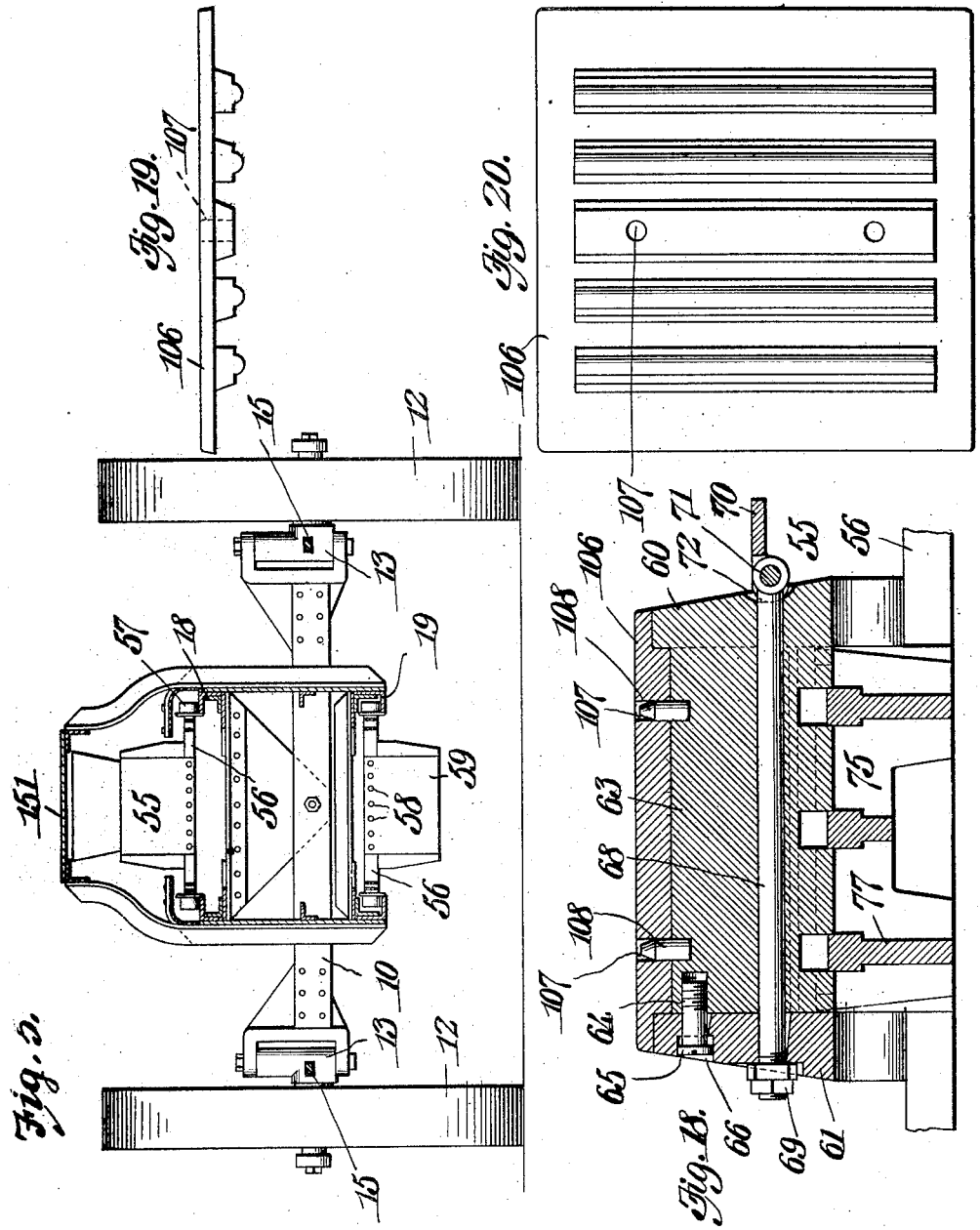

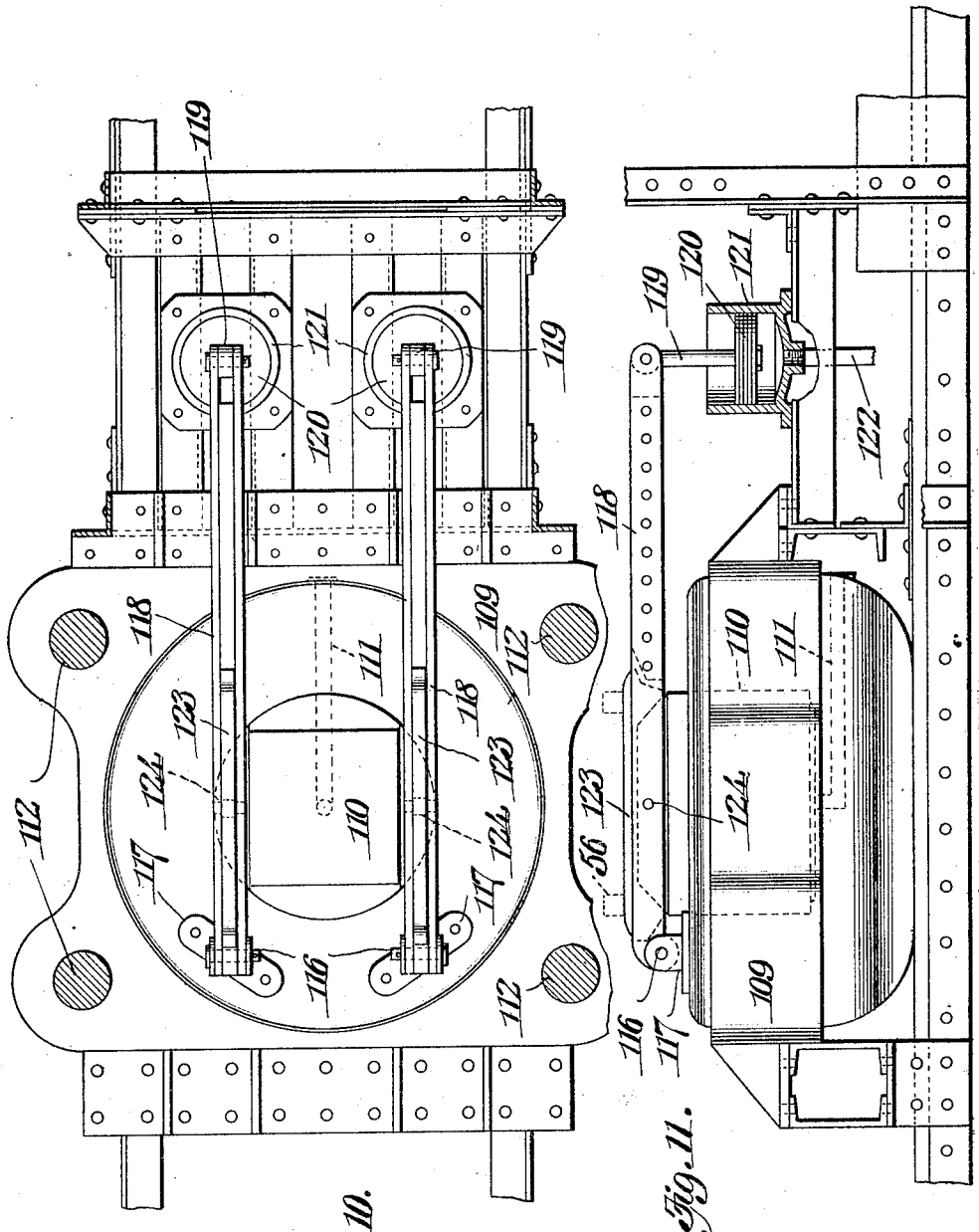

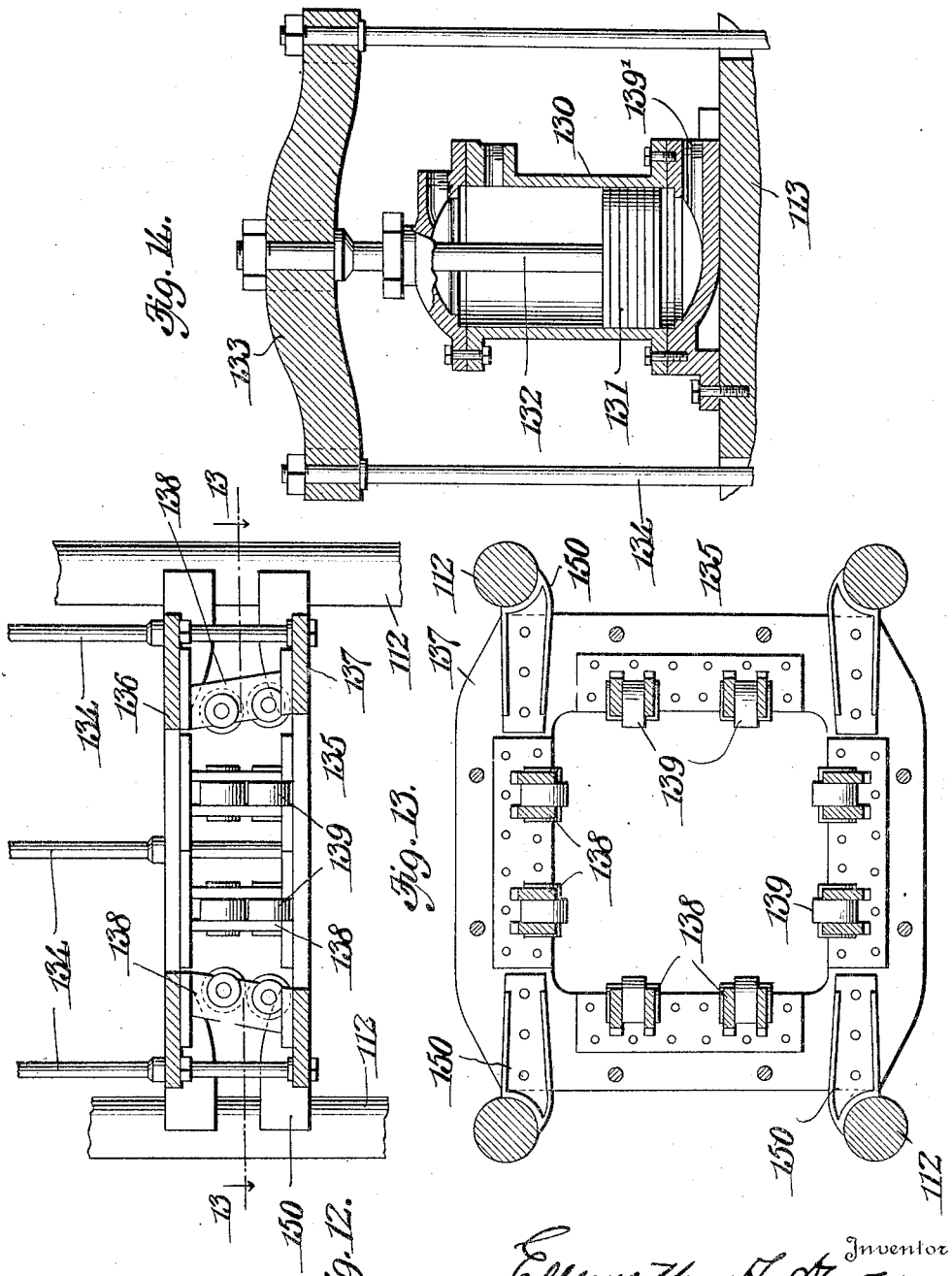

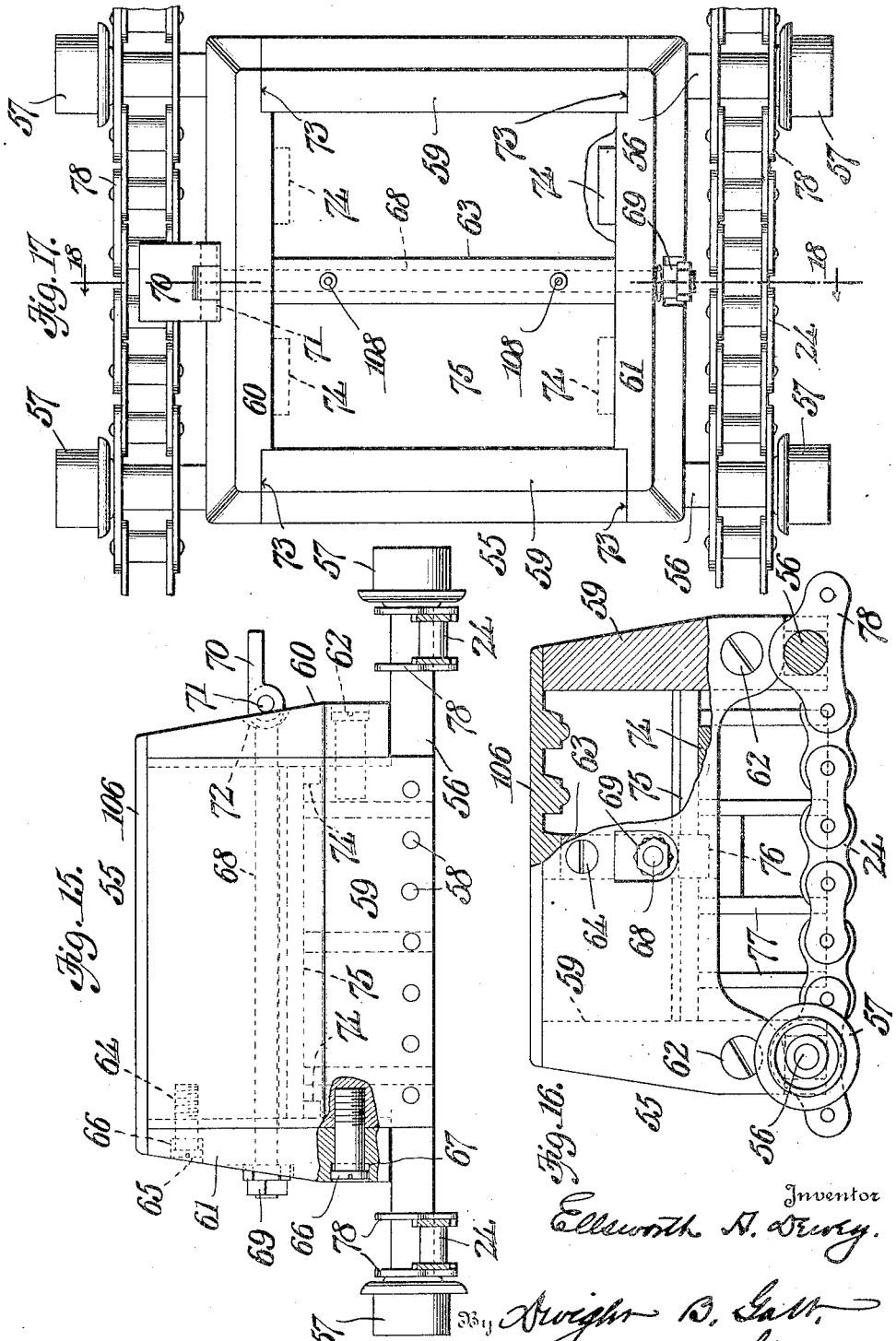

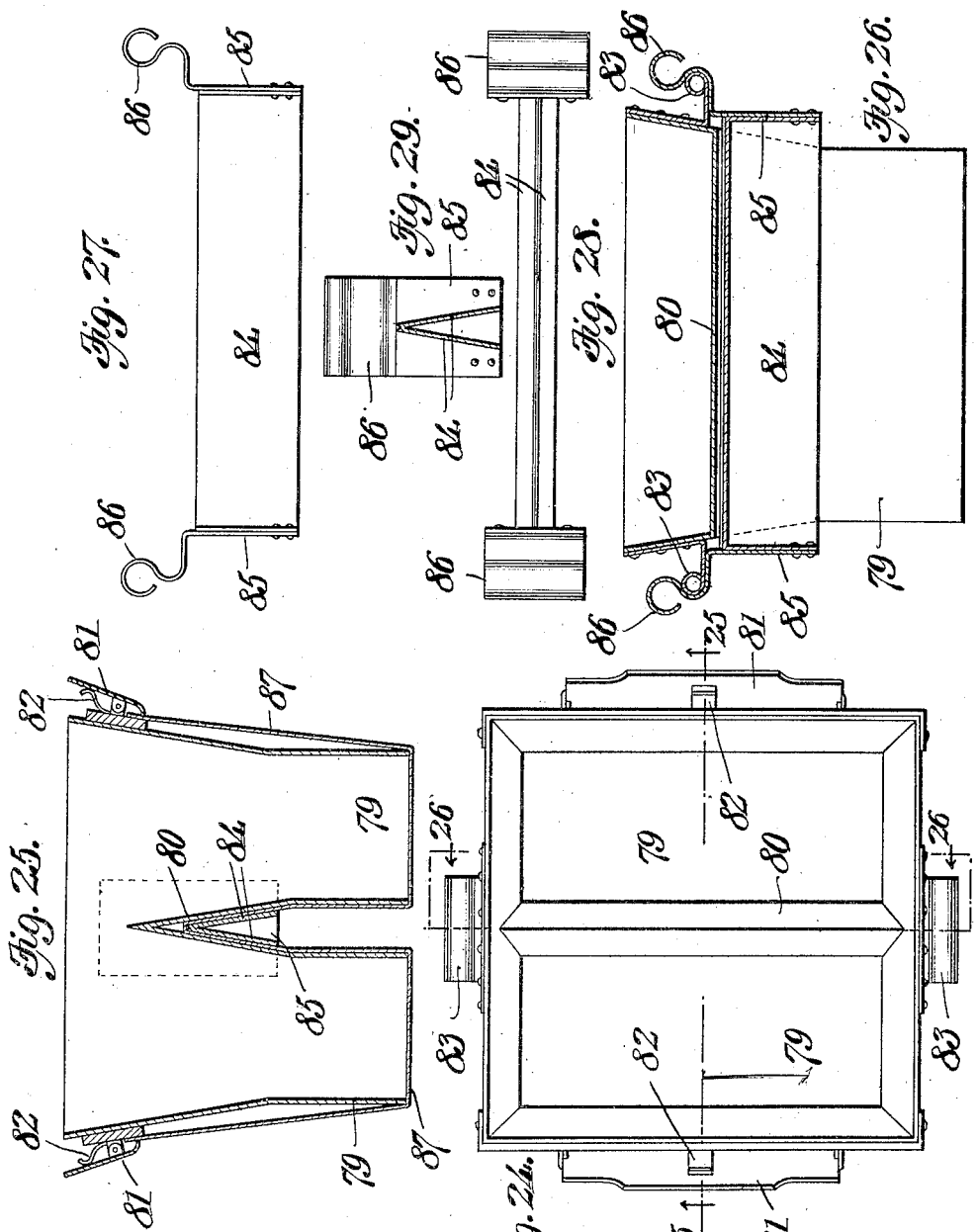

ELLSWORTH A. DEWEY, OF TAMPA, FLORIDA.

BLOCK-MAKING MACHINE.

1,346,640.  Specification of Letters Patent.  Patented July 13, 1920.

Application filed July 19, 1917. Serial No. 181,515.

*To all whom it may concern:*

Be it known that I, ELLSWORTH A. DEWEY, a citizen of the United States, residing at Tampa, in the county of Hillsborough and State of Florida, have invented certain new and useful Improvements in Block-Making Machines, of which the following is a specification.

This invention relates to plastic block machines, and particularly to machines for forming blocks of asphalt or the like.

The invention has for its primary object to provide an apparatus which shall possess mechanism capable of performing all the functions or operations incident to the production of blocks of the nature mentioned, and which may be easily transported from place to place, whereby the expense and inconvenience connected with equipments now employed in the attainment of the same ends, is obviated.

The invention aims further to provide an apparatus adapted primarily for producing paving, or building blocks such as those described in the pending application of Edward H. Trebes, Serial #63,446, and wherein each plastic block is provided with a shell or covering of paper or other material.

A further object of the invention is to provide a plastic block machine which is so arranged or constructed that the mold filling, mold conveying, pressure applying and discharging functions of such devices is greatly simplified.

A still further object of the invention is to provide a machine of the character described which includes a pressure applying mechanism, and wherein improved means is employed for moving the molds individually into the pressure mechanism; for holding the mold conveyer against movement during the pressure applying operation; for holding the molds securely during the application of pressure; for establishing a driving connection between a source of power and the mold conveyer after the pressing operation; and for discharging the blocks from their respective molds at the proper time.

Still further objects reside in providing a portable block molding apparatus which includes a press and a conveyer for moving the molds into the press, and wherein molds of improved construction are employed; which is provided with improved means for moving the conveyer step by step so as to properly present each mold to the press; which includes improved means for preventing excessive pressure being transmitted to the sides or weaker parts of the molds; which provides improved means for preventing the plastic mass within the molds escaping therefrom during the pressing operation; and which includes means for compensating for the expansion of the blocks in the molds after compression; so as to prevent the blocks becoming misshapen.

A still further object of the invention is to provide an improved filling hopper for the molds, and which includes means for properly positioning and maintaining a paper or other liner within the molds preparatory to the filling of the latter.

With these objects in view, together with others which will appear as the description proceeds, the invention resides in the novel formation, combination, and arrangement of parts, all as will be described more fully hereinafter, illustrated in the drawings, and particularly pointed out in the claims.

Referring to the drawings:—

Figure 1 is a side elevation of a block machine constructed in accordance with my invention, the wheels on the near side of the machine being removed, Fig. 2 is a fragmentary top plan view of the machine shown in Fig. 1, the impression making mechanism being removed, Fig. 3 is a sectional view taken on a slightly enlarged scale on line 3—3 of Fig. 1, Fig. 4 is a sectional view taken on line 4—4 of Fig. 1, Fig. 5 is an enlarged sectional view taken on line 5—5 of Fig. 2, Fig. 6 is an enlarged fragmentary plan view of the vehicle frame and illustrating the mechanism for creating a step by step movement in the mold conveyer, Fig. 7 is a view similar to Fig. 6 and showing the mechanism in changed position, Fig. 8 is an enlarged sectional view taken on line 8—8 of Fig. 7, Fig. 9 is a sectional view taken through the supporting frame and illustrating the impression forming mechanism, Fig. 10 is an enlarged plan view of the press, Fig. 11 is a fragmentary side elevation of the press, Fig. 12 is a transverse section taken through the mold clamping mechanism, Fig. 13 is a horizontal sectional view taken on line 13—13 of Fig. 12, Fig. 14 is a vertical sectional view taken through the mechanism for operating the clamping means, Fig. 15 is an enlarged fragmentary front elevation of one of the molds, Fig. 16 is a side elevation of the mold. parts being broken away, Fig. 17 is a top plan view of the mold, Fig. 18 is a sectional view taken on line 18—18 of Fig. 17, Fig. 19 is a side elevation of the cover plate for the mold, Fig. 20 is a bottom plan view of the cover plate, Fig. 21 is a bottom plan view of the movable bottom for the mold, Fig. 22 is a side elevation of the said bottom, Fig. 23 is a sectional view taken centrally and longitudinally through the movable bottom, Fig. 24 is a top plan view of the filling hopper for the molds.

Fig. 25 is a sectional view taken through the hopper on line 25—25 of Fig. 24, and showing the manner in which the paper liner for the mold is held, Fig. 26 is a sectional view taken on line 26—26 of Fig. 24, Fig. 27 is a side elevation of the device for applying the paper liner to the hopper, Fig. 28 is a top plan view of the said device, and Fig. 29 is a sectional view taken laterally through the paper applying device.

The invention contemplates generally the provision of a block making mechanism, which is mounted upon a suitable carriage so as to be capable of being readily transported from place to place and quickly set up for operation. Mounted upon the carriage is a press of any approved type, and which is adapted to supply the pressure required in the production of the blocks. The power for operating this press may be supplied from a source or plant located upon the vehicle, or may be derived from some extraneous source. The machine shown in the drawings is of that type wherein the power is supplied from a motor or source separate from the block press vehicle.

The carriage is provided with a conveyer on which is mounted the molds for forming the blocks, and this conveyer travels past or through the press so that the contents of the molds may be subjected to the power of the press. Prior to the filling of the molds at one end of the conveyer, a liner is placed in each mold so that each of the finished blocks will be incased by a shell. An improved mold filling hopper is used in the filling operation, and this hopper carries the liner and properly applies the same to the interior of each mold.

The conveyer moves intermittently through the machine, and at certain of its stages of rest the plastic contents of the molds is so treated and operated upon that perfectly formed and tightly compressed blocks are delivered from the foot of the machine. An improved mechanism is employed for moving the conveyer and for rendering the same inactive at the proper times, in order that the molds or their contents may be properly operated upon in the various stages of rest. The molds may have one or more movable sides to permit of the expansion of the plastic after the compression, whereby misshapen or distorted blocks are obviated. An improved clamping mechanism is applied to the mold sides during compression to relieve the sides of the molds from strain and to prevent oozing of the plastic from the mold side joints. The molds are lifted from their trackways when in the press, in order that the strains incident to the compressing operation will not be transmitted to the trackways or the vehicle structure.

The molds are so constructed and are so arranged upon the conveyer that they automatically open and deposit their contents when the molds reach the delivery end of the machine.

The carriage or vehicle employed in carrying out the invention includes an elongated body or frame having front and rear axles 10 and 11 respectively, which carry the ground wheels 12. The spindles for the front wheels are pivoted in yokes or steering knuckles 13, and each are provided with forwardly and rearwardly projecting arms 14 and 15; the arms 15 on the opposite sides of the vehicle being connected by a rod 16, whereby turning of the spindles in unison will be assured. Pivotally connected at its ends to the forward extremities of the arms 14 is a bow 17, and to which a draft tongue or pole of any suitable type may be attached. From this particular construction it is apparent that the vehicle may be easily steered as it travels over the ground. The axles 10 and 11 may be rigidly secured in the body or frame in any suitable manner.

The body or frame comprises upper and lower parallel longitudinally disposed trackways 18 and 19 respectively, the former being positioned above the supporting axles of the vehicle, while the latter is arranged below the said axles. These trackways in the present instance are constructed from angle irons as shown, and are rigidly connected together by the vertical and angularly disposed braces or struts as shown. The braces when arranged in the manner shown lend rigidity and strength to the vehicle frame, and assist in evenly distributing the weight and strains to which the body may be subjected.

Disposed transversely of the vehicle body at the ends thereof and midway between the upper and lower trackways are conveyer shafts 20 and 21, each of which carries a pair of conveyer sprockets or pulleys 22 and 23, over which the endless conveyer chains 24 pass. These sprockets are of such diameter and are so arranged upon their respective shafts that the chains 24 passing thereover will be disposed in the same horizontal planes with the upper and lower trackways, and will be spaced inwardly from the tracks at the opposite sides of the vehicle frame. The shaft 20 is rotatably mounted in bearings capable of being adjusted longitudinally of the vehicle, and the shaft 21 is similarly mounted in bearings adapted to be adjusted vertically, so that proper alinement and tension of the conveyer chains may be attained.

The shaft 21 is provided with a pair of centrally located power sprockets 25, preferably a trifle less in diameter than the sprockets 23, but having an equal number of teeth therewith, and over which power chains 26 are trained. These central sprockets are of less diameter than the sprockets 23, so that the axles of the molds to be hereafter described will not engage the teeth of the said power sprockets, or the chains 26 passing over the same. These chains 26 are also passed over sprockets 28 loosely mounted upon a jack shaft 29 on the vehicle frame near the rear end thereof. These sprocket wheels are provided on their outer sides with oppositely disposed clutch faces 30 and 31, with which the clutch heads 32 and 33 are adapted to engage. The clutch head 32 is keyed to the jack shaft and rotates therewith and is adapted when engaged with the clutch face 30 to establish a power connection between said shaft and said sprockets. The head 33 is slidable upon the shaft 29 but does not rotate therewith, and is adapted when engaged with the clutch face 31 to hold or lock the sprockets 28 against rotation. The jack or driven shaft 29 derives its rotary movement from a belt or chain 24 trained over a sprocket pulley 35 on said shaft and also trained over a sprocket 36 affixed to the power shaft 37 on the vehicle frame. The shaft 37 is also equipped with a sprocket 38 for the accommodation of a suitable power chain from some extraneous power source.

Projecting outwardly from one of the sprockets 28 is a trip for actuating a mechanism to be hereinafter described, and this trip in the present instance comprises a roller 39 rotatably mounted in bearings carried by a band 40 affixed to the said sprocket so as to rotate therewith. This roller projects beyond the periphery of the sprockets, as shown particularly in Fig. 8 of the drawings.

It is desired that the clutch and lock heads 32 and 33 be thrown alternately into engagement with their respective clutch faces on the sprockets 28, so that the locking head will be disengaged from the sprocket when the clutch head 32 is "thrown in," and the power head will be "thrown out" when the locking head 33 is holding the sprockets against rotation. This action is accomplished by connecting the heads 32—33 to a laterally shiftable frame 41. The frame comprises arms 42 and 43 pivoted at their inner ends as at 44 to the vehicle body, and connected together adjacent their free ends by a link 45. The free end of the arm 42 pivotally supports a band 46 seated in a suitable groove or channel in the periphery of the clutch head 32, while the outer end of the arm 43 is engaged with trunnions projecting outwardly from the locking head 33. This last mentioned construction prevents the locking head from rotating. The arms thus arranged will move in unison, and a contractile spring 48 connects the arm 43 with a fixed part of the vehicle; the said spring tending normally to hold the frame 41 with the locking head engaged with its adjacent clutch pulley and the clutch head 32 removed from the face 30.

Pivoted at one end as at 49 to the arm 43 of the movable frame is a toggle lever 50, the latter being pivoted as at 51 at its opposite end to the inner extremity of a lever 52, the last mentioned lever being pivoted inwardly from its outer end as at 53 to the vehicle frame. It will be observed that the lever 50 is of such length that its point of connection with the lever 52 will pass approximately in the path of travel of the trip roller 39 carried by the band 40 when the toggle is "straightened." It will also be observed that when the operating end of the lever 52 has been moved to its forward limit, (see Fig. 7) the pivot connecting the ends of the toggle levers 50—52 will have passed beyond a straight line through pivots 49 and 53, and the tension of the spring 48 will lock the toggle and the frame 41 in the position shown in the said figure. When so positioned, the head 32 will be engaged with its adjacent clutch pulley so that a power connection between the shaft 29 and the twin driving sprockets 28 is established. The frame 41 and movable elements which it controls will remain so positioned until the pivotal connection between the levers 50—52 has been moved forwardly of a straight line through points 49 and 53, whereupon the spring 48 will draw the frame into the position shown in Figs. 2 and 6. The operating end of the lever 52 may be moved manually by grasping the same or by means of a cord or cable attached thereto.

Projecting downwardly from one of the toggle levers 50—52 at their point of connection is a lug 54, which lies in the path of travel of the trip roller 39 when the toggle is "straightened." The roller projects far enough beyond the pulley 28 to force the pivot point of the said levers beyond a dead center through the pivots 49—53 when the roller engages the lug 54, and it is thus seen that the toggle will be tripped and the power connection between the shaft 29 and pulleys 28 will be severed automatically once in each revolution of the said pulleys.

The conveyer chains 24 move the molds, indicated generally at 55 along the trackways on the vehicle frame, and actuation of the particular clutch mechanism above described causes the movement of the said chains to be intermittent. The molds are spaced apart evenly along the chain, so that the said molds will all be halted at regular stages or stations on the vehicle frame, and at certain of these stages the contents of the molds is treated or operated upon to produce the completed and perfected blocks.

The improved molds employed in carrying out the invention are each supported upon front and rear axles 56, upon the ends of which track wheels 57 are rotatably mounted. It will be observed that the wheels are provided with flanges, so that when the wheels rest upon the upper and lower trackways, lateral movement of the molds will be prevented. Affixed at their lower ends to the axles 56 as by bolts or screws 58 are the mold end plates 59, the latter being formed of relatively heavy metal and having their outer faces beveled or inclined inwardly from adjacent their lower ends to their upper edges. The side plates for the molds are indicated at 60 and 61, each of which is pivoted as at 62 adjacent its lower edges to the ends of the plates 59, and the pivots 62 are vertically alined with the axles 56. The side plates have their outer faces beveled or inclined similar to the end plates, and the upper edges of the side and end plates lie in the same plane. The side plate 60 carries intermediate its ends a right angularly disposed plate or wall 63, which constitutes a partition for the interior of the mold. This dividing wall terminates at its upper edge a slight distance below the upper edges of the side and end walls, and abuts at its outer end with the side plate 61. A screw or stud 64 extends loosely through the plate 61 and is secured in the dividing wall 63. This screw or stud is provided with a head 65 which fits within an enlarged and relatively deep recess or pocket 66 in the wall 63; the construction preventing the plate 61 moving longitudinally of the mold but permitting the said plate moving toward or away from the opposite side plate 60. The pivots 62 for the plate 61 are also headed as shown at 66, which heads lie within the recesses 67 of the side plate, whereby lateral play of the said plate is permitted.

A tie or binding rod 68 extends throughout the width of the mold 55, and passes through the dividing wall or partition 63. Jam nuts 69 are attached to one end of said rod and bear against the outer face of the side plate 61, and a cam lever 70 is pivoted as at 71 to the opposite end of the said rod. This cam rests in a pocket 72 formed in the outer face of the side plate 60, and is adapted when moved in one direction to draw the side plate 61 into tight engagement with the ends of the division or partition wall 63 and end plates 59, but when moved in reverse direction this binding action will be relieved, so that the side plate 61 may move outwardly until such movement is arrested by engagement of the bottoms of the pockets 66—67 with the heads of the members 62 and 64. When the movable side plate is moved inwardly or into tight engagement with the mold ends, the cam operating lever will be disposed horizontally, or in the position shown in Figs. 15, 17, and 18, and downward rocking movement of the cam lever will release the said movable side plate. It will be observed, particularly with reference to Fig. 17 of the drawings, that the inner faces of the side plates 60—61 are shouldered at their ends as at 73 to receive the ends of the mold ends 59, thus forming a tight joint to overcome the possibility of the plastic material oozing from the mold.

The inner faces of the side plates 60—61 are provided adjacent their lower ends with spaced inwardly extending lugs 74, upon which the ends of a movable bottom plate 75 rest, the said bottom constituting a vertically movable plunger. The bottom 75 is provided in its upper face with a laterally disposed central depression or groove 76 which accommodates the lower edge of the dividing wall 63, and this depression is of such depth that a slight degree of upward movement may be given to the said plate before its travel is halted by the said dividing wall. The under surface of the plunger or bottom is reinforced with downwardly extending webs 77, which, when the bottom plate is resting upon the lugs or supports 74, have their lower ends disposed in substantially the same horizontal plane with the bottoms of the axles 56.

Rotatably mounted upon each axle and adjacent the ends thereof are chain plates 78, to which the chain links of the conveyer 24 are pivotally attached. These chain plates are provided so that the connection between the mold axles and the conveyer chain will possess sufficient flexibility to permit of the said axles and molds passing around the conveyer pulleys or sprockets 22 and 23 at the ends of the vehicle frame.

It will be observed, particularly with reference to Fig. 1 of the drawings, that the distance between the axles of each mold is equal to that between the axles of the adjacent molds on the conveyer. The sprockets or pulleys 28 are of such diameter that a single revolution of the same will, through the chains 26 and gears 25, cause the conveyer chain 24 to advance the length of one mold. The movement of the conveyer will be automatically terminated when the sprockets 28 have made a complete revolution, or as soon as the trip roller 39 engages the toggle mechanism and forces it rearwardly, as has been described before. The conveyer chain will remain stationary and locked against advancing until the toggle lever 52 is moved in the direction of the arrow in Fig. 6, whereupon the clutch mechanism will again operate to drive the chain, as will be readily understood. The conveyer is thus operated in a step by step manner, and the molds arrive successively in the various stages of rest throughout the length of the vehicle frame. As the molds pass from the upper trackway to the sprocket wheels 23 at the foot and rear of the vehicle, the end plates of the molds will rock outwardly upon the pivots 62, as shown in Fig. 1, thereby widening the compartments in the molds, and after the molds have become inverted in their travel around the said sprockets, the blocks therein will be dropped out. A suitable container may be placed at the delivery end of the vehicle frame to catch the blocks dropped from the molds, or a conveyer may be used to receive the completed blocks and carry the same away. When nearing completely inverted position, the front rollers of each mold will enter within and rest upon the lower trackway 19, and the conveyer chain will be relieved of the weight of the molds. From this description it is seen that the emptying of the molds is automatic, and the closing of the mold ends at the front or filling end of the machine so as to be ready for further use, is also performed automatically.

The asphalt or material of which the blocks are formed is poured into the molds at the front or filling end thereof, and both compartments of each mold may be filled at the same time. To aid in properly directing the plastic block material into the molds, an improved hopper is provided, and this hopper is constructed so as to be capable of being quickly and easily applied to or detached from the molds. As it is one of the objects of the invention to produce a paving or building block having a casing or outer shell of paper or other thin and substantially impervious material, the improved hopper is arranged so as to properly line or apply the paper to the inner walls of the mold prior to the filling operation. The hopper is illustrated in detail in Figs. 24 to 26 inclusive, and comprises a pair of leg portions 79, formed of thin sheet metal having smooth inner and outer surfaces, and which are of a shape and size to fit snugly one within each compartment of the mold. These leg portions are joined together as indicated at 80, and the said legs straddle the partition or dividing wall 63 when properly applied. The lower open ends of the leg portions reach to the bottoms of the compartments, and the upper walls of the hopper protrude from the mold and are flared as shown so as to increase the area at the filling end or mouth. The sides of the outwardly protruding portions of the hopper legs are provided with spring clasps, the jaws 81 of which extend downwardly and are held yieldably in clamping position by leaf springs 82. The upper ends of the said jaws are adapted to be engaged and pressed by the fingers to move the clamps to releasing position when required.

The ends of the said hopper are equipped with rolled portions 83, which project outwardly and upwardly from the hopper intermediate the lateral edges thereof. These portions are adapted to hold a paper inserting tool in proper position upon the mold, the said tool being engaged between the leg portions of the hopper. This tool is constructed of thin sheet metal, having an elongated body adapted to conform to the converging walls of the legs at their juncture with each other. The body comprises a pair of plates 84 of narrow width each a trifle longer than the hopper; the upper longitudinal edges of the said plates being joined together, while the opposite longitudinal edges are spaced slightly apart. The body thus assumes the form of an inverted V in cross section. End plates 85 connect these side or body plates 84, and the upper extremities of the said end plates are bent outwardly and then rolled inwardly to form clamps 86 for yielding engagement with the rolled portions 83 of the hopper ends. It will be seen therefore that it is necessary to spring the portions 86 over those 83 of the hopper and when thus positioned, the inserting tool will be firmly held within the crotch at the juncture of the hopper legs.

In applying the liner to the hopper, one end of a strip of paper 87, of a width substantially equal to the length of the hopper, is engaged by one of the clamp jaws 81, and the free portion of the paper is passed to the under side or bottom of the hopper and upon the exterior thereof. The inserting tool is then inserted between the hopper legs as shown in Fig. 25, carrying with it the paper, and when the tool reaches the limit of its upper movement, the clamp portions 86 snap or spring over the rolled portions 83, thus holding the tool and paper firmly between the legs and tightly stretched over the lower open end of one of the legs. The remaining length of the paper is then stretched over the lower end of the other leg and is carried up the hopper side and secured at its extremity beneath jaw 81 on the hopper side. The liner or paper is thus firmly held on the hopper, and it is apparent that when the hopper is applied to the mold with its legs straddling the partition wall thereof, the bottoms and sides of the mold compartments upon their interiors will be covered with the paper. After being applied to the mold in this manner, the mold is ready for the filling operation. When the mold compartments have been sufficiently filled, the clamp jaws 81 are released from the paper ends, whereupon the hopper may be easily slid upwardly and out of the mold, leaving the paper liner firmly held in place by the weight of the block material. Before the hopper is removed, however, the spring ends 86 of the applying tool are released from the rolled portions 83, so that the tool will remain between the mold compartments resting upon the partition 63. The paper stretched over the tool is slit at its apex, so that the paper will be divided and so that the tool can be removed. The upper protruding ends of the paper are then folded down upon the exposed upper surfaces of the plastic material, and the mold is then ready to be advanced to a further stage in the operation.

The blocks produced by the machine illustrated in the drawings are provided in their under surfaces with spaced longitudinally disposed channels, the said channels being co-extensive with the blocks. The walls of the channels are shouldered, and the shoulders extend throughout the length of the blocks. The upper surfaces of the plastic within the molds will constitute the bottoms or under surfaces of the completed blocks, and improved means is provided for forming the block channels.

Blocks of this particular type are most practical for my purposes, but it will be understood, of course, that I am not to be restricted to the use of the machine in producing such blocks, as the size, thickness and shape of the molds may be varied, and with the use of differently formed impression dies and mold cover plates, blocks having plain, ribbed, corrugated, channeled, socketed, or shouldered faces may be produced.

Arranged over the path of travel of the molds, and at such position as to be directly over one of the stations of inaction or rest of the various molds is a die for forming the channels in the upper exposed surface of the plastic material. This die is indicated at 88, and comprises a plate adapted to seat upon and cover the upper surface of the mold. The plate is provided in its under face with spaced longitudinally disposed ribs 89, adapted when the plate is lowered to press into and form the desired channels in the plastic material; it being understood, of course, that the number, size, depth, and shape of the ribs will depend upon the type of block it is desired to produce. The die plate is bolted or in any other preferred manner secured to the base or block 90, the latter being equipped with hand grips 91 to facilitate proper positioning of the die. The die block is pivoted intermediate its ends to the lower extremities of toggle arms 92, the latter being pivoted at their upper extremities as at 93 to the lower ends of the toggle levers 94. These levers 94 are connected at their upper ends to spaced shafts being rotatably mounted at their ends in bearings 96 vertically adjustable upon the frame bars 97 extending upwardly from the vehicle frame. The shafts 95 are provided with intermeshing segments 98, so that rotary movement of one shaft will be imparted to the other. It will be observed that the arms 92 converge at their connection with the die block, and are spaced apart at their juncture with the toggle levers 94, while the latter levers are inclined toward each other as they extend upwardly. As the bearings 96 for the shafts 95 are normally stationary and held positively against sliding movement, it is apparent that movement of the pivots 93 toward each other will cause the die to move downwardly, and movement of the pivots in the opposite direction will cause the die to be lifted free of the mold. A rod 99 is secured at one end to one of the shafts 95, and carries a sliding weight 100, the latter being held in adjusted positions upon the rod by a set screw 101. The rod extends off from the shaft to which it is attached at an angle to the vertical so that the weight 100 at all times tends to rock the shaft in such direction that the die will be in raised position.

A hand lever 102 is pivoted at 103 at one end to one of the toggle levers 94 intermediate the ends of the latter, and extends past and beyond the opposite toggle lever 94. A link 104 is pivoted at one end as at 105 to the hand lever 102 inwardly from the ends thereof, and connects at its opposite extremity with the adjacent pivot 93 of the toggle levers. It is obvious therefore, that downward swinging movement of the hand lever 102 will force the pivot 93 inwardly, while the opposite toggle levers will correspondingly move, and the particular construction of the mechanism is such that a powerful downward pressure of the die will be produced with the expenditure of but a small amount of power in the hand lever. The downward movement of the die produces the desired impression in the plastic material, and immediately upon the lever 102 being released, the weight 100 will cause the toggle to move the die upwardly free of the mold.

After the impression has been made in the upper surface of the plastic, as above outlined, a cover plate 106 is placed upon the mold. This cover plate is identical in size and shape with the die 88, so that its ribs fit within the impressions made by the said die. The cover fits snugly upon the mold, and is provided with openings 107 through which studs 108 secured in the upper edge of the partition wall 63 of the mold project. This particular arrangement prevents lateral shifting of the cover plate upon the mold.

Subsequent to the impression making and cover plate applying operations, the molds enter successively into a press, where the requisite pressure is applied to the plastic material. This press is in the present instance positioned upon the vehicle adjacent the rear axle thereof, and the base of the press is indicated at 109. The press base is suitably supported on the vehicle frame beneath the upper conveyer trackway 18, and is equipped with an upwardly movable piston or plunger 110. This plunger is forced upwardly into engagement with the vertically movable bottom of the mold by means of hydraulic pressure admitted to the plunger chamber through the port or duct 111.

Extending upwardly from the base 109 and outside the trackway are posts (or strain rods) 112 which support at their upper ends a head plate 113, the latter being provided with a depending platen 114 against which the molds are pressed. This platen is secured to the lower ends of beams 115, centrally arranged upon the under face of the head plate, and is positioned directly above the path of travel of the molds. It will be observed that there is a slight clearance between the platen and cover plate of the mold when the latter moves upon the track into the press, so that upward movement must be delivered to the mold before the latter engages at its cover plate with the platen. It is necessary, therefore, that the mold be lifted from its supporting trackway 18 before this can be accomplished.

Pivoted at their rear ends as at 116 in suitable brackets 117 upon the upper face of the base, are levers 118; the said levers being arranged one on each side of the press plunger and parallel with the direction of travel of the conveyer. The levers each consist of a pair of bars spaced slightly apart, and the upper edges of which are normally disposed slightly below the plane of the lower surfaces of the axles 56 of the molds. These levers project forwardly from the press base, and each connects at its free end with a piston rod 119 extending upwardly from a piston 120 mounted for vertical movement in a cylinder 121 on the vehicle frame. A steam or air supply pipe 122 communicates with the interior of each cylinder at the lower end thereof, and it is apparent that the introduction of fluid pressure to the cylinders will cause the levers 118 to move upwardly; rocking upon their pivots 116. Each of the levers carries a rocker 123 which is adapted to engage the under surfaces of the mold axles when the levers are raised, and to move the mold upwardly. These rockers comprise plates pivoted intermediate their ends as at 124 between the bars of their respective levers so as to be capable of rocking longitudinally, and the upper edge of each rocker protrudes slightly beyond the corresponding edge of its supporting lever. It will be observed that the rocker plates are of sufficient length to engage the front and rear axles of the mold simultaneously, and are located adjacent the sides of the vertically movable press piston 110, in order that the mold will be moved upwardly directly over the press piston and at a time when the conveyer is inactive. It is apparent, therefore, that when a mold arrives within the press and over the piston, fluid pressure admitted to the cylinders 121 will cause the levers 118 to swing upwardly, whereupon the mold is engaged by the rocker plates and lifted from the trackway 18 and forced at its upper end against the platen 114. This upward pressure is sufficient to tightly seat and hold the cover plate 106 in position upon the mold, so that the plastic contents of the mold compartments can not ooze or spill out when the press piston is operated.

Immediately after the mold has been forced into hard contact with the platen, steam or air pressure is admitted under the press piston or plunger 110, whereupon the latter moves upwardly and engages the vertically movable bottom 75 of the mold. This bottom is capable of moving a distance sufficient to enable the mold contents to be tightly compressed between itself and the cover plate, and it is understood that the mold bottoms or plungers may be constructed so as to be capable of traveling a greater or less distance than that shown in the drawings. It will also be understood that a high degree of compression is necessary to sufficiently press the block material.

Associated with this press is mechanism for holding the mold properly centered in the press and for securely holding the movable sides of the mold together during compression. This mechanism also includes means for unlocking the laterally movable mold side, in order that the latter may be free to move after the mold has passed from the press.

Mounted upon the upper face of the head block or plate 113 and preferably in the center thereof is a vertically disposed cylinder 130, within which travels a piston 131. This piston has secured thereto a rod 132, extending through a suitable packing gland in the top of the cylinder as shown. The upper end of this rod carries a spider or frame 133, from the outer ends of which depend the rods 134. These rods extend downwardly past the sides and ends of the head block, and support between them at their lower ends a centering frame indicated generally at 135. This frame includes a pair of spaced upper and lower plates 136 and 137 respectively, having central alined openings, corresponding in shape to the plan of the mold, but being slightly larger than the mold. The opening in the lower plate 137 is slightly larger than the opening in the plate 136, as the said lower plate is adapted to inclose the mold adjacent its lower end. This lower frame plate when moving downwardly engages the horizontally disposed cam lever 70, and forces the same downwardly so that the movable side 61 of the mold will be released. These frame plates are connected to each other by a plurality of brackets 138, the latter extending from one plate to the other adjacent the central openings therein, each being equipped with a pair of rollers 139, the peripheries of which protrude into the central openings. It will be observed that the brackets 138 are inclined inwardly and upwardly from the bottom frame plate, and the inner edges of the said brackets are alined with the edges of the central frame plate openings. It will also be seen that there are four pairs of roller brackets 138, two arranged in spaced relation upon each of the four sides of the central apertures in the frame plates, and the said brackets are disposed parallel to the inclined side and end walls of the molds. When air or steam is admitted to the cylinder 130 at its lower end through the duct 139', the piston 131 will be moved upwardly and the centering frame will be elevated. The frame is capable of moving upwardly a distance sufficient to allow the molds to pass into the press. After each mold is halted over the press piston, air is admitted to the cylinders 121, whereupon the mold is raised and forced at its upper end against the platen 114. The centering frame is then lowered and the rollers carried thereby engage the side and end walls of the mold to hold the same tightly together during compression.

Communicating with the interior of the cylinder 130 at the extreme upper end is a pipe 140, (see Fig. 1) while a pipe 141 is tapped into the cylinder a slight distance below the pipe 140, and a pipe 142 communicates with the duct 139' at the base of the cylinder. These pipes are equipped with valves 143, 144, and 145 respectively, which are of such construction as to be capable of establishing communication between the pressure source and the cylinder; to be capable of severing such communication and exhausting the air in the cylinder to the atmosphere; and which may also be operated so as to stop the flow of pressure through the pipe in either direction. Now when it is desired to lower the centering frame, valve 144 is moved to "cut off" position, and valve 143 is opened sufficient to admit a low degree of pressure to the upper end of the cylinder. Valve 145 is partly opened to exhausting position and remains so set until the rollers on the centering frame engage the sides and ends of the mold, when the said valve 145 is opened to full exhausting position and the valves 143 and 144 are opened to admit a full head of pressure to the top of the piston. This manipulation of the valves causes the mold to be held firmly in position and against spreading when the press is operated.

After compression and it is desired to raise the centering frame, the valve 143 is closed and valve 144 is moved to a position to permit of the air above the piston passing to the atmosphere. The valve 145 is then moved to admit pressure beneath the piston. The piston is forced inwardly and continues to so travel, closing the exhaust pipe 141 when approaching the top of the cylinder. The steam or air which is confined between the piston and the top of the cylinder arrests the upward movement of the piston and forms an air cushion. The live steam or air pressure below the piston will hold the latter and the centering frame in raised position, while the conveyer is operated so as to bring the next mold into the press. The centering frame is provided with outwardly extending guide arms 150, which slidably engage at their outer ends with the posts 112 to hold the frame at all times in proper alinement.

In operation, assuming the conveyer to be halted, the filling hopper is applied to the mold at the filling end of the machine. At this stage, the cam lever 70 is moved upwardly to horizontal position, whereby the movable side wall 61 will be drawn inwardly and locked in proper position. The plastic material is then poured into the mold compartments. This may be done from the filling platform indicated at 151. The clutch mechanism is then operated so as to cause the conveyer to advance one step; the trip mechanism automatically bringing the conveyer to a stop at the proper time as has been described. The hopper may then be removed and the ends of the paper liner properly folded over the upper surface of the plastic. The clutch mechanism is again operated and the mold arrives beneath the impression die, and the latter is actuated to groove or shoulder the upper surface of the plastic. The conveyer then moves the mold another step and the cover plate 106 is applied. After this has been done the conveyer advances the mold to the compression stage, whereupon the lifting, centering, and pressing operations take place. When these operations are completed, the mold moves out of the press, and it will be remembered that the side plate 61 of the mold was released by the centering frame when the latter moved downwardly over the mold. The remaining stages through which the mold passes are the cooling periods, and the blocks will be permitted to expand in every direction sufficiently to prevent buckling or distortion of the blocks. The movable side plate 61 permits of this expansion. When the mold reaches the sprockets at the discharge end of the vehicle frame, the end walls of the mold will rock upon their pivots, and when the mold is inverted the blocks will drop by gravity into a suitable receptacle or upon a suitable conveyer provided to receive them. It will be understood, of course, that each of the molds on the conveyer passes through the same stages, and that operations and treatments of the materials are going on simultaneously at all of the different stages, so that a number of blocks are produced in comparatively short time.

While the present is a disclosure of the preferred embodiment of the invention, it is to be understood that the invention is not limited thereto, as various changes in the minor details of construction, proportion and arrangement of parts may be resorted to without departing from the spirit of the invention as defined in the appended claims.

What is claimed is:—

1. In a device of the class described, a vehicle, a press on said vehicle, and a carrier movable through said press.

2. In a device of the class described, a vehicle, a press mounted on said vehicle, a carrier movable through said press, a power mechanism for moving said carrier, and means for breaking said power mechanism automatically at predetermined intervals.

3. In a device of the class described, a vehicle, a press on said vehicle, a carrier movable through said press, molds on said carrier, and means for automatically stopping said carrier when each mold is within said press.

4. In a device of the class described, a vehicle, a press on said vehicle, a carrier movable through said press, a power shaft, a power connection between said shaft and said carrier, a clutch on said shaft, and means for automatically disengaging said clutch when said carrier has moved a predetermined distance.

5. In a device of the class described, a vehicle, a press on said vehicle, a carrier movable through said press, a power mechanism, a clutch in said mechanism, means for automatically disengaging said clutch when said carrier has moved a predetermined distance, and means for resetting said clutch.

6. In a device of the class described, a carrier, a power mechanism for driving said carrier, a clutch in said mechanism, means for disengaging said clutch when said carrier has moved a predetermined distance, and means for holding said carrier against movement when said clutch is disengaged.

7. In a device of the class described, a carrier, a power mechanism, a clutch in said mechanism, means for automatically disengaging said clutch when said carrier has moved a predetermined distance, and means for holding said mechanism against operation when said clutch is disengaged.

8. In a device of the class described, a carrier, a shaft, a power connection between said shaft and carrier, a clutch in said shaft, and means for automatically disengaging said clutch upon each complete revolution of said shaft.

9. In a device of the class described, a carrier, a shaft, a power connection between said shaft and said carrier, a clutch in said shaft, and means for automatically disengaging said clutch when said shaft has passed through a predetermined number of degrees of rotation.

10. In a device of the class described, a carrier, a shaft, a power connection between said shaft and said carrier, a clutch in said shaft, and means for holding said shaft against rotation when said clutch is disengaged.

11. In a device of the class described, a carrier, a power mechanism for moving said carrier, means for breaking the power connection between said carrier and mechanism, and means operating simultaneously with said power breaking operation for locking said carrier against movement.

12. In a device of the class described, a carrier, a power mechanism for moving said carrier, means for automatically breaking the power connection between said mechanism and said carrier when the latter has moved a predetermined distance, and means operating simultaneously with said power breaking operation for holding said carrier against moving.

13. In a device of the class described, a carrier, a shaft, means for transmitting movement from said shaft to said carrier, a clutch in said shaft, a lock on said shaft adapted to engage said power transmitting means, and a connection between said lock and said clutch whereby said lock will be engaged with said means when said clutch is disengaged.

14. In a device of the class described, a carrier, a driven shaft, a pulley rotatably mounted on said shaft, a belt on said pulley for transmitting power to said carrier, a clutch member keyed to said shaft and capable of moving into and out of locking engagement with said pulley, and a trip mechanism for disengaging said clutch member from said pulley when said carrier has moved a predetermined distance.

15. In a device of the class described, a carrier, a driven shaft, a pulley rotatably mounted on said shaft, a belt on said pulley for transmitting power to said carrier, a clutch member keyed to said shaft and capable of moving into and out of locking engagement with said pulley, and a trip mechanism for disengaging said clutch from said pulley when said shaft has passed through a certain number of degrees of rotation.

16. In a device of the class described, a carrier, a driven shaft, a pulley rotatably mounted on said shaft, a belt on said pulley for transmitting power to said carrier, a clutch member keyed to said shaft and capable of moving into and out of locking engagement with said pulley, a trip mechanism adapted when actuated to disengage said clutch member from said pulley, and a cam on said shaft for actuating said mechanism.

17. In a device of the class described, a carrier, a driven shaft, a pulley rotatably mounted on said shaft, a belt passing over said pulley for transmitting power from the latter to said carrier, a clutch member keyed to said shaft and being capable of moving into and out of engagement with said pulley, a locking head loose on said shaft and being capable of engaging said pulley, arms connected to said clutch member and locking head, a link connecting said arms, a toggle for moving one of said arms, a yieldable member exerting pressure on said arm against said toggle, and a cam on said shaft adapted to engage the joint in said toggle.

18. In a device of the class described, a press, a mold capable of traveling through said press, and a centering frame on said press adapted to hold said mold during the pressing operation.

19. In a device of the class described, a press, a mold capable of traveling through said press, a centering frame on said press to receive and hold said mold, and the said mold being held by said frame just prior to the pressing operation.

20. In a device of the class described, a press, a mold capable of traveling through said press, the said mold having relatively movable sides, a movable member on said press, and the said member being adapted to engage said sides to hold the same together during the pressing operation.

21. In a device of the class described, a press, a mold capable of traveling through said press, certain of the sides of said mold being movable, and a centering frame on said press adapted to receive said mold and to engage said sides prior to the pressing operation to hold the mold together during such operation.

22. In a device of the class described, a press, a mold capable of moving through said press and being provided with relatively movable walls, the said walls being inclined on their outer faces, a centering frame on said press adapted to receive said mold, and rollers on said frame to engage said inclined faces.

23. In a device of the class described, a press, a mold capable of moving through said press, the said mold having relatively movable walls inclined on their outer faces, a movable centering frame on said press to receive said mold, rollers on said frame, the said rollers being arranged in pairs and the rollers of each pair being disposed at substantially the same angle as that of said inclined faces, whereby said walls will be forced inwardly when said frame is moved into operative position.

24. In a device of the class described, a press, a mold having relatively movable walls, a movable clamping frame on said press adapted to inclose said mold, inwardly projecting rollers on said clamp adapted to engage the various walls of said mold, the said rollers being angularly disposed, and means for moving said frame.

25. In a device of the class described, a press, a mold having relatively movable walls, a movable clamping frame on said press adapted to inclose said mold, rollers projecting from said frame and being adapted to engage the walls of said mold, the outer faces of said walls being inclined in the direction of movement of said frame, and means for moving said frame.

26. In a device of the class described, a press, a mold having a laterally movable wall, means for moving said mold into said press, a movable centering frame over said press, rollers on said frame adapted to engage the walls of said press when the frame is lowered, a cylinder, a piston in said cylinder, and a connection between said piston and said frame.

27. In a device of the class described, a press, a mold adapted to enter said press and having a laterally movable wall, a movable centering frame over said press, the said mold and frame being movable toward each other, rollers on said frame adapted to engage the mold walls and to apply inward pressure upon the same, means for moving said frame, and means for moving said mold.

28. In a device of the class described, a press, a mold adapted to be moved into said press, a movable centering frame above said press and capable of inclosing said mold, said frame comprising a pair of superimposed plates each having an aperture, the aperture of one plate being larger than that of the other, angularly disposed struts connecting said plates, rollers on said struts adapted to engage the side walls of said mold, and means for raising or lowering said frame.

29. In a device of the class described, a press, a mold, a centering frame mounted for vertical movement over said press and being adapted when lowered to inclose said mold, a cylinder, a piston in said cylinder, fluid supply pipes communicating with the upper and lower ends of said cylinder, a pipe communicating with said cylinder below the upper end thereof, and a connection between said piston and frame.

30. In a device of the class described, a press, a mold movable through said press, an impression making mechanism adjacent the path of travel of said mold and in advance of said press, and means for protecting the impression made by said mechanism during the pressing operation.

31. In a device of the class described, a press, a mold movable through said press, an impression making mechanism in advance of said press and above the path of travel of said mold, the said mechanism including a die adapted to enter the mold, and a lever for moving said die.

32. In a device of the class described, a press, a mold movable through said press, an impression making mechanism mounted in advance of said press and above the path of travel of said mold, the said mechanism including a die adapted to close the open side of said mold, and a plate for protecting the impression made by said mechanism during the operation of said press.

33. In a device of the class described, a press, a conveyer movable through said press, a plurality of molds on said conveyer, an impression making device arranged above the path of travel of said conveyer and in advance of said press, means for actuating said impression making device, and means for protecting the impression during the operation of said press.

34. In a device of the class described, a press, a mold movable through said press, a frame arranged in advance of said press and above the path of travel of said mold, a die mounted for vertical movement in said frame, the said die being adapted to move into and out of contact with said mold, and means for covering the mold after the latter has been contacted by said die.

35. In a device of the class described, a press, a mold movable through said press, means for making an impression in the contents of said mold prior to the entrance of the latter to said press, and a cover plate for said mold adapted to be applied to and to close the same after the impression making operation.

36. In a device of the class described, a press, a mold movable through said press, a frame arranged in advance of said press and above the path of travel of said mold, a die mounted for vertical movement in said frame, the said die being adapted to move into and out of contact with said mold, means for moving said die, and means for normally holding said die out of contact with said mold.

37. In a device of the class described, a press, a mold movable through said press, a frame arranged in advance of said press and above the path of travel of said mold, a toggle on said frame, a die carried by said toggle and being adapted to contact said mold, and means for moving said toggle.

38. In a device of the class described, a press, a mold movable through said press, a frame arranged in advance of said press and above the path of travel of said mold, a toggle on said frame, a die carried by said toggle and being adapted to contact said mold, means for moving said toggle, and means for normally holding said toggle with said die out of contact with said mold.

39. In a device of the class described, a press, a mold movable through said press, a frame arranged in advance of said press and adjacent the path of travel of said mold, a pair of toggle levers, on said frame, intermeshing gears on said levers, a die supported by said levers and adapted to contact said mold, and means for moving one of said levers.

40. In a device of the class described, a press, a mold movable through said press, a frame arranged in advance of said press and being disposed above the path of travel of said mold, a pair of toggle levers suspended from said frame, intermeshing gears on said levers, a die supported by said levers and adapted to contact said mold, a movable member pivoted at one end to said frame, a link connecting said member with one of said levers, and means for normally maintaining said toggle levers in raised position.

41. In a device of the class described, a press, a conveyer movable through said press, molds arranged in spaced relation on said conveyer and being connected separately to the latter, and the said molds being adapted to open at certain intervals in the movement of said conveyer.

42. In a device of the class described, a press, a conveyer, molds spaced apart equal distances on said conveyer, pulleys supporting said conveyer, movable ends for each said molds, and the said ends being adapted to swing away from each other when said conveyer moves over said pulleys.

43. In a device of the class described, a press, a conveyer, pulleys over which said conveyer passes a mold on said conveyer, movable end plates pivoted on said mold, and the said plates being connected to said conveyer.

44. In a device of the class described, an endless conveyer, sprockets supporting said conveyer, a mold carried by said conveyer, axles for said mold secured to said conveyer, end plates secured at their lower ends to said axles, and the said plates being pivoted to said mold above said axles.

45. In a device of the class described, an endless conveyer, axles carried by said conveyer, end plates secured at their lower ends to said axles, side plates pivoted at their ends adjacent the lower ends of said end plates, and a bottom resting upon said side plates.

46. In a device of the class described, an endless conveyer, axles extending across said conveyer, a mold carried by said axles, said mold comprising end plates each secured at their lower ends to one of said axles, said end plates pivoted at their lower ends to said side plates, lugs on the inner walls of said side plates, and a vertically movable bottom plate resting upon said lugs.

47. In a device of the class described, a conveyer, a mold having a laterally movable side wall, a rod connected to said side wall and extending through said mold, and a cam lever on the opposite end of said rod adapted when moved in one direction to draw said movable side into locked position.

48. A mold, a side for said mold capable of moving bodily toward or away from the same, a tie rod secured to said side and extending through said mold, a cam lever on the free end of said rod, and the said lever being adapted to draw said side inwardly.

49. A mold comprising end and side plates, one of said side plates being capable of moving laterally, a tie rod loosely extending through said movable plate, nuts on said rod limiting the movement of said rod in one direction, a cam on the free end of said rod, and the said cam being adapted to move said rod so as to draw said movable plate inwardly.

50. In a device of the class described; a press, a conveyer capable of moving through said press, a mold on said conveyer, a lifting mechanism in said press, and means for operating said lifting mechanism to raise said mold prior to the operation of said press.

51. In a device of the class described; the combination with a press and platen, of a mold interposed between said press and platen, and means for moving said mold against said platen.

52. In a device of the class described; the combination with a press and platen, of a mold interposed between said press and platen, and means for moving said mold against said platen prior to the operation of said press.

53. In a device of the class described; the combination with a press and platen, of a mold interposed between said press and platen, means for causing the mold and platen to contact, and a centering frame inclosing said mold.

54. In a device of the class described; the combination with a press and platen, of a mold interposed between said press and platen, and a movable centering frame adapted to inclose said mold during the operation of said press.

55. In a device of the class described; the combination with a plunger and platen, of a mold movable between said plunger and platen, a centering frame adapted to inclose said mold, and means for moving said frame.

56. In a device of the class described; the combination with a plunger and platen, of a mold movable between said plunger and platen, the said mold having movable sides, and a centering frame adapted to hold said sides together during the operation of said plunger.

57. In a device of the class described; the combination with a plunger and platen, of a mold movable between said plunger and platen, a pair of levers adjacent said plunger, rockers on said levers adapted when the latter are moved upwardly to engage and support said mold, cylinders, pistons in said cylinders, connections between said pistons and levers, and means for admitting pressure to said cylinders.

58. In a device of the class described, the combination with a press, of a centering frame movable toward said press, a cylinder, a piston in said cylinder, a connection between said piston and said frame, and means for controlling the flow of fluid pressure to said cylinder.

59. In a device of the class described, the combination with a press, of a mold movable into said press, a movable centering frame adapted to inclose and engage the walls of said mold, a cylinder, a piston in said cylinder, a connection between said piston and said frame, and means for controlling the flow of fluid pressure in said cylinder.

60. In combination; a press, a conveyer movable into said press, a mold on said conveyer, a platen, a lifting mechanism for moving said mold against said platen, a movable centering frame adapted to inclose said mold, and means for moving said frame.

61. In combination with a mold, a hopper adapted to extend into said mold, a fitting tool, clamps on said hopper, and means for securing said tool to said hopper.

62. In combination with a mold having double compartments; a hopper having a pair of spaced outlets, a tool adapted to engage between said outlets, clamps for holding the ends of paper stretched across said outlets, and spring clamps for holding said tool to said hopper.

63. In a device of the class described, a press, a mold movable into said press, a die adapted to make an impression upon the contents of said mold prior to its entrance to the press, a cover plate for the mold adapted to be applied thereto after the impression making operation, and the said cover plate having a surface corresponding to the operative face of said die.

64. In a device of the class described, a press, a mold movable into said press, a die comprising a plate of equal length and width with said mold adapted to move into engagement with the latter prior to the entrance of the mold to the press, the operative face of said die being adapted to engage the contents of the mold, a cover plate of equal length and width with said mold adapted to be applied to the latter subsequent to the operation of said die, and one face of said cover plate corresponding to the configuration of the operative surface of said die.

65. In a device of the class described, the combination with a pressing mechanism including a plunger, of a mold movable into said mechanism, a movable bottom for said mold adapted to be operated upon by said plunger, and means for supporting said mold during the operation of said pressing mechanism.

66. In a device of the class described, the combination with a press including a plunger and a platen, a mold adapted to move between said plunger and platen, a movable bottom for said mold adapted to be operated upon by said plunger, and means for forcing said mold into contact with said platen prior to the actuation of said plunger.

67. In a device of the class described, the combination with a press including a plunger and a platen, of a mold movable between said plunger and platen, levers adjacent said press for engaging said mold and moving the same into contact with said platen, and means for moving said levers.

68. In a device of the class described, the combination with a press including a plunger and a platen, of a mold movable between said plunger and platen, a pair of levers arranged adjacent said press and being adapted when moved in one direction to engage said mold and to force the same into contact with said platen, a cylinder, a piston in said cylinder, and a connection between said levers and said piston.

69. In a device of the class described, the combination with a press including a plunger and a platen, of a mold movable into said press and between said platen and plunger, a pair of levers arranged one upon each side of said plunger and being capable of moving toward or away from said platen and into engagement with said mold, and means for moving said levers simultaneously.

70. In a device of the class described, the combination with a press including a plunger and a platen, of a mold movable into said press and between said platen and plunger, axles supporting said mold, a pair of levers pivoted one upon each side of said plunger and capable of moving into or out of engagement with said axles, and means for moving said levers simultaneously.

71. In a device of the class described, the combination with a press including a plunger and a platen, of a track passing through said press, a mold movably mounted on said track, and a lifting apparatus adapted when the mold is between the platen and plunger to raise said mold off the track and into engagement with the said platen.

72. In a device of the class described, the combination with a press including a platen, of a track passing through said press, a conveyer passing through said press, a plurality of molds connected to said conveyer and resting on said track, a lifting mechanism adapted to engage the said molds as they enter the press and to raise the same off the track and into contact with said platen, and means for operating said lifting mechanism.

73. In a device of the class described, the combination with a press including a vertically movable plunger, of a mold movable into said press and in vertical alinement with said plunger, a bottom in said mold capable of moving inwardly thereof, and webs depending from said bottom and extending longitudinally and laterally thereof and being adapted to be engaged by said plunger.

74. In a device of the class described, a mold having sides and ends, lugs projecting inwardly from the said sides, and a bottom resting at its edges upon said lugs and being capable of moving inwardly of said mold.

75. In a device of the class described, a mold having sides and ends, lugs projecting inwardly from said sides, a partition connecting said sides, a bottom resting upon said lugs and being capable of moving inwardly of said mold, and the said bottom having a transversely disposed recess to receive said partition when said bottom is moved.

76. In a device of the class described, a mold comprising a pair of end members, side walls pivoted to the said end members below the lower ends thereof, and means at the lower ends of said end members for the attachment of chains thereto.

77. In a device of the class described, a mold comprising a pair of end members, axles connected to the lower ends of said members and being disposed longitudinally thereof, side walls fastened at their lower ends to said end members above the lower extremities of the latter, and chains connected to said axles.

78. In a device of the class described, a pair of sprockets, a chain passing over said sprockets, a mold including a pair of end members secured in spaced relation at their lower ends to said chain, and side walls fastened at their lower extremities to said end members above the points of connection of the said chains therewith.

79. In a device of the class described, sprockets arranged in spaced relation to each other, conveyer chains passing over said sprockets, a pair of axles connected to said chains, end members permanently secured at their lower ends to said axles, and side walls fastened at their lower ends to said end members above the points of connection of the said chains with said axles.

80. In a device of the class described, a mold having a movable side, a cam for holding said side at the limit of its inward movement, and a movable centering frame adapted to engage around said mold to hold the walls thereof together and to move said cam to releasing position.

81. In a device of the class described, a mold, a movable side wall for said mold, a tie rod passing through said mold and the said movable wall, a cam on the end of said rod adapted when in one position to hold said movable wall at the limit of its inward movement, and a movable centering frame adapted to be let down around said mold to engage the side and end walls thereof and to move said cam to releasing position.

82. In a device of the class described, a press, a mold movable across said press and adapted to be operated upon by the same, a centering frame above the press adapted to receive the said mold and to exert pressure upon the latter, the said mold and frame being movable toward each other, means for moving said mold, and means for moving the said frame.

83. In a device of the class described, a vehicle, a press on said vehicle, sprockets at the ends of said vehicle, chains passing over said sprockets and through said press, and molds carried by said chains.

84. In a device of the class described, an intermittently moving mold, means for facilitating the filling of the mold, means for making an impression upon the contents of the mold, means for compressing the mold contents, and means whereby the removal of the mold contents from the latter will be facilitated when the mold has reached a predetermined position.

85. In a device of the class described, a vehicle, a conveyer upon said vehicle, molds carried by said conveyer, an impression making apparatus on said vehicle adjacent to the path traversed by the molds and adapted to operate upon the contents of the latter, and a press to receive the molds after the impression making operation and adapted to compress the contents of the said molds.

86. In a device of the class described a vehicle, a press on said vehicle, a conveyer on said vehicle movable through the press, molds on said conveyer, means for driving said conveyer, means for automatically stopping the conveyer when the molds successively enter the press, and means for holding the molds during the pressing operation.

87. In a device of the class described, a press, a mold movable into the press, the said mold having a laterally movable side, means for holding the said mold during the pressing operation, and the said means releasing the said mold side prior to the operation of the press.

In testimony whereof I affix my signature in the presence of two witnesses.

ELLSWORTH A. DEWEY.

Witnesses:
C. M. KNOTT,
P. F. CRARY.